(12) United States Patent
Sanada et al.

(10) Patent No.: US 11,428,450 B2
(45) Date of Patent: Aug. 30, 2022

(54) AIR CONDITIONER

(71) Applicant: FUJITSU GENERAL LIMITED, Kanagawa (JP)

(72) Inventors: Shintaro Sanada, Kanagawa (JP); Yu Hirosaki, Kanagawa (JP); Naruhiro Sekine, Kanagawa (JP); Ryo Takaoka, Kanagawa (JP); Koya Aoki, Kanagawa (JP); Tatsuro Yamazaki, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 42 days.

(21) Appl. No.: 16/981,026

(22) PCT Filed: Feb. 15, 2019

(86) PCT No.: PCT/JP2019/005706
§ 371 (c)(1),
(2) Date: Sep. 15, 2020

(87) PCT Pub. No.: WO2019/181315
PCT Pub. Date: Sep. 26, 2019

(65) Prior Publication Data
US 2021/0018236 A1 Jan. 21, 2021

(30) Foreign Application Priority Data
Mar. 22, 2018 (JP) .............................. JP2018-054336

(51) Int. Cl.
*F25B 49/02* (2006.01)
*F25B 41/31* (2021.01)
*F25B 13/00* (2006.01)

(52) U.S. Cl.
CPC .............. *F25B 49/02* (2013.01); *F25B 13/00* (2013.01); *F25B 41/31* (2021.01);
(Continued)

(58) Field of Classification Search
CPC .. F25B 13/00; F25B 2500/07; F25B 2500/27; F25B 2600/11; F25B 2600/2513; F25B 2600/2519; F25B 41/31; F25B 49/02
See application file for complete search history.

(56) References Cited

U.S. PATENT DOCUMENTS

| 5,044,169 A | 9/1991 | Inoue |
| 2010/0107665 A1 | 5/2010 | Kawano et al. |

(Continued)

FOREIGN PATENT DOCUMENTS

| CN | 101086372 | 12/2007 |
| CN | 101384866 | 3/2009 |

(Continued)

OTHER PUBLICATIONS

International Search Report issued in International Patent Application No. PCT/JP2019/005706, dated May 7, 2019, along with an English translation thereof.

(Continued)

*Primary Examiner* — Henry T Crenshaw
(74) *Attorney, Agent, or Firm* — Greenblum & Bernstein, P.L.C.

(57) ABSTRACT

An air conditioner includes an outdoor unit, a plurality of indoor units, a plurality of expansion valves which are provided upstream of indoor heat exchangers, a plurality of on-off valves which are provided upstream of the expansion valves, and control unit wherein when the indoor units include a stopping indoor unit and an operating indoor unit currently operating, and when a stopping of the stopping unit is due to thermostat-off operation, the control unit performs a procedure to stop the stopping unit, the procedure including closing an on-off valve that corresponds to the stopping unit and driving an indoor fan in the stopping unit until pressure in a part between the on-off valve and an expansion valve that corresponds to the stopping unit and pressure in (Continued)

a part downstream of the first expansion valve are equalized, fully opening the expansion valve, and stopping the indoor fan.

3 Claims, 4 Drawing Sheets

(52) U.S. Cl.
CPC ....... *F25B 2500/07* (2013.01); *F25B 2500/27* (2013.01); *F25B 2600/11* (2013.01); *F25B 2600/2513* (2013.01); *F25B 2600/2519* (2013.01)

(56) References Cited

U.S. PATENT DOCUMENTS

| | | | | |
|---|---|---|---|---|
| 2013/0091882 A1* | 4/2013 | Cho | ........................ | F25B 13/00 62/156 |
| 2014/0083126 A1* | 3/2014 | Shimazu | ................ | F25B 30/02 62/324.6 |
| 2015/0034293 A1* | 2/2015 | Takayama | ................ | F24F 11/83 165/207 |
| 2015/0176880 A1* | 6/2015 | Ochiai | .................... | F25B 49/02 62/115 |

FOREIGN PATENT DOCUMENTS

| | | |
|---|---|---|
| CN | 105864982 | 8/2016 |
| GB | 2566201 B | 2/2021 |
| JP | 8-061744 A | 3/1996 |
| JP | 10-274448 A | 10/1998 |
| JP | 10274448 * | 10/1998 |
| JP | 2005-221167 A | 8/2005 |
| JP | 2005-241050 A | 9/2005 |
| TW | M392940 | 11/2010 |
| WO | 2018/011994 A1 | 1/2018 |

OTHER PUBLICATIONS

Nov. 15, 2021 extended European Search Report in corresponding European Application No. 19770497.6 and English translation thereof.

Jun. 25, 2021 Office Action in corresponding Chinese Application No. 201980020805.3 and English translation thereof.

* cited by examiner

AIR CONDITIONER

FIELD

The present invention relates to an air conditioner and particularly to a multi-type air conditioner including a plurality of indoor units.

BACKGROUND

A refrigeration cycle is formed in the following manner in an air conditioning apparatus that includes a refrigerant circuit obtained by connecting an outdoor unit and a plurality of indoor units via a liquid pipe and a gas pipe the outdoor unit including a compressor, a reversing valve, and an outdoor heat exchanger, the indoor units each including an indoor heat exchanger and an expansion valve. A refrigerant that has been discharged from the compressor and then flowed into a heat exchanger then functioning as a condenser to condense therein flows via an expansion valve into a heat exchanger then functioning as an evaporator to evaporate therein, and then is suctioned into a compressor again.

In the air conditioning apparatus as described above, typically, even when the refrigerant accumulates in any component (for example, a liquid pipe in a case where a refrigeration cycle works as a cooling cycle, or an indoor heat exchanger in the indoor unit that has stopped operating) of a refrigerant circuit, a refrigerant charge amount is determined, with consideration given to not only the amount of refrigerant needed in the refrigerant circuit but also the amount of refrigerant that accumulates in the refrigerant circuit, so that the amount of refrigerant needed for enabling air conditioning capabilities needed in respective indoor units (described hereinbelow as the air conditioning capabilities unless a need arises to use the above term) to be exercised at the same time can be circulated in the refrigerant circuit.

However, an inconvenience here is that the cost increases as the refrigerant circuit is charged with a higher amount of refrigerant. In addition to the inconvenience of the above-described cost increase, when the refrigerant circuit is charged with a flammable refrigerant (for example, R32), if the refrigerant has leaked in a space having any of the indoor units installed and the amount of leakage is large, it is highly possible that the concentration of the refrigerant in the space having the indoor unit installed reach a concentration that may possibly cause the refrigerant to catch fire.

In view of this inconvenience, as a technique for preventing a refrigerant from accumulating in an indoor unit that has stopped operating, a technique has been disclosed that provides on-off valves at respective entrances and exits of outdoor units and shuts the on-off valve that corresponds to the indoor unit that has stopped operating (see, for example, Patent Literature 1).

However, when applied to a multi-type air conditioner for buildings that has indoor units provided with respective expansion valves, the technique in Patent Literature 1 involves an inconvenience that a refrigerant in the liquid phase present upstream of the expansion valve (in a liquid pipe) that corresponds to the indoor unit that has stopped operating accumulates. There is another inconvenience that noise of refrigerant that occurs when the operation is stopped causes a situation such that a user mistakenly thinks that the air conditioner has failed.

CITATION LIST

Patent Literature

Patent Literature 1: Japanese Laid-open Patent Publication No. 2005-221167

SUMMARY

Technical Problem

The present invention is intended to solve the inconveniences described above, and is aimed at providing an air conditioner that not only prevents a refrigerant in the liquid phase from accumulating in an indoor unit that has stopped operating during cooling operation but also prevents a user from mistakenly thinking that the air conditioner has failed.

Solution to Problem

The present invention is understood as follows to meet the above objectives.

(1) A first viewpoint of the present invention is an air conditioner which includes an outdoor unit, a plurality of indoor units which have indoor heat exchangers and indoor fans inside thereof, respectively, a plurality of expansion valves which correspond to the indoor units and are provided upstream of the indoor heat exchangers that function as evaporators, a plurality of on-off valves which correspond to the indoor units and are provided upstream of the expansion valves, and a control unit configured to selectively control individual components in the air conditioner, wherein when the indoor units include a stopping unit that is an indoor unit instructed to stop operating and an operating unit that is an indoor unit currently operating, and when a stopping of the stopping unit is due to thermostat-off operation, the control unit performs a procedure to stop the stopping unit, the procedure including closing the on-off valve and driving an indoor fan in the stopping unit until pressure in a part between an on-off valve that corresponds to the stopping unit and an expansion valve and pressure in a part downstream of the expansion valve are equalized, fully opening the expansion valve that corresponds to the stopping unit, and stopping the indoor fan.

(2) According to above mentioned (1), when the stopping of the stopping unit is stopping due to a stop operation from a user, the control unit opens the expansion valve fully and stops the indoor fan in the stopping unit, without waiting for equalization of pressure in the part between the on-off valve that corresponds to the stopping unit and the expansion valve and pressure in the part downstream of the expansion valve.

(3) According to above mentioned (1) or (2), wherein the on-off valves are connected to respective parts of a plurality of liquid pipes that correspond to the indoor units, the respective parts being near a branching part of the liquid pipes, and the expansion valves are connected to indoor unit liquid pipes inside the indoor units, respectively.

Advantageous Effects of Invention

According to the present invention, an air conditioner can be provided that prevents a refrigerant in the liquid phase from accumulating in an indoor unit that has stopped operating during cooling operation.

DESCRIPTION OF DRAWINGS

Embodiment

The following describes an embodiment according to the present invention in detail with reference to the accompanying drawings. The description uses, as an example of the embodiment, a multi-type air conditioner that includes an outdoor unit and four indoor units connected to the outdoor unit in parallel to one another and is capable of causing all of the indoor units to perform cooling operation or heating operation at the same time. The present invention is not limited to the embodiment described below and can be variously modified without departing from the gist of the present invention.

Figure 1A:
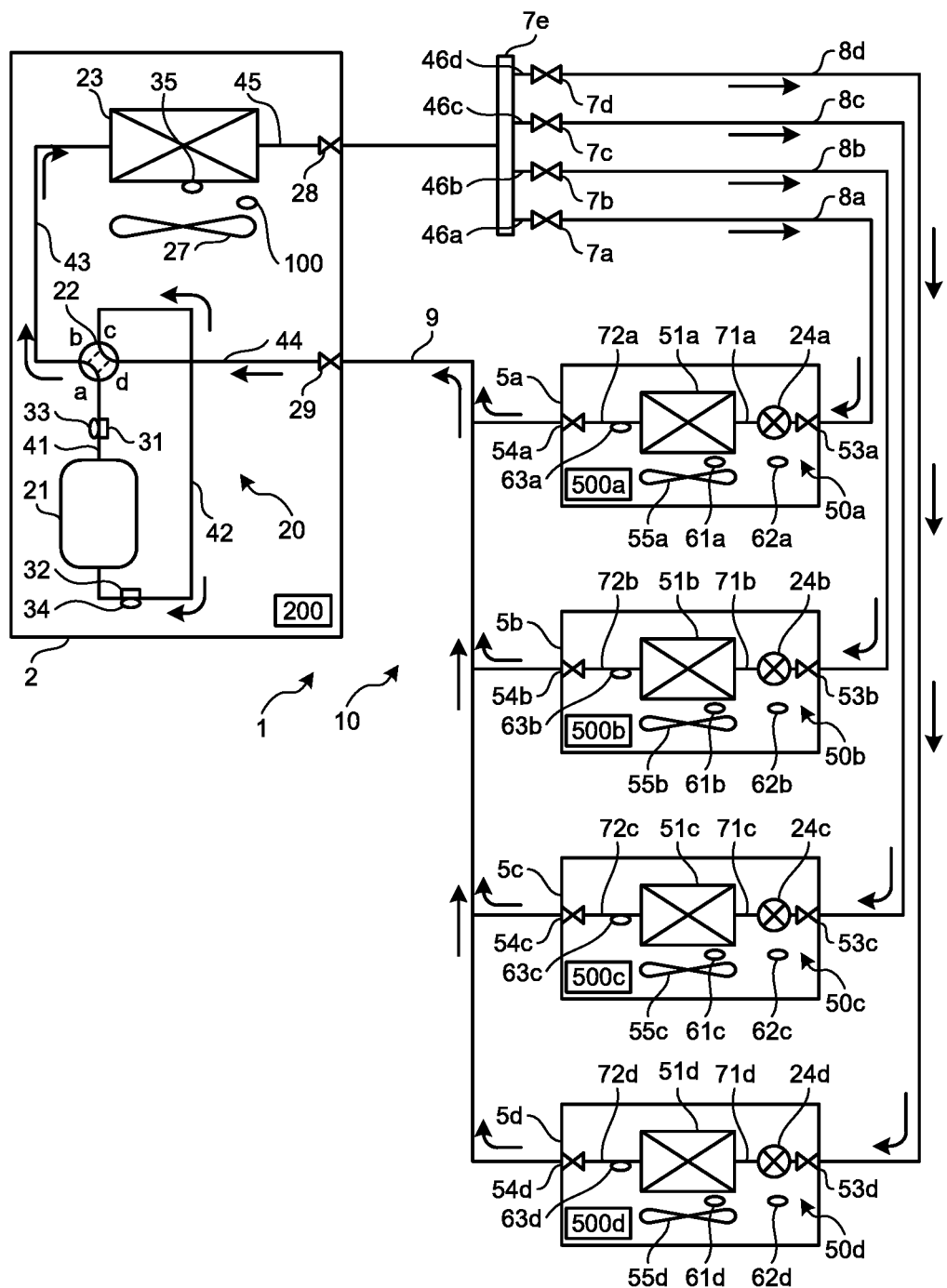
FIG. 1A is a refrigerant circuit diagram explaining an air conditioner of the present embodiment.

As illustrated in FIG. 1A, an air conditioner 1 in the present embodiment includes: an outdoor unit 2 installed outdoor; and four first to fourth indoor units 5a to 5d installed indoor and connected to the outdoor unit 2 in parallel to one another via a first liquid pipe 8a, a second liquid pipe 8b, a third liquid pipe 8c, a fourth liquid pipe 8d, and a gas pipe 9.

In detail, one end of the first liquid pipe 8a is connected to a liquid-side stop valve 28 of the outdoor unit 2 via a first on-off valve 7a, a first liquid separation pipe 46a, and a branching part 7e, and the other end thereof is connected to a first liquid-side connection part 53a of the first indoor unit 5a. One end of the second liquid pipe 8b is connected to the liquid-side stop valve 28 of the outdoor unit 2 via a second on-off valve 7b, a second liquid separation pipe 46b, and the branching part 7e, and the other end thereof is connected to a second liquid-side connection part 53b of the second indoor unit 5b. One end of the third liquid pipe 8c is connected to the liquid-side stop valve 28 of the outdoor unit 2 via a third on-off valve 7c, a third liquid separation pipe 46c, and the branching part 7e, and the other end thereof is connected to a third liquid-side connection part 53c of the third indoor unit 5c. One end of the fourth liquid pipe 8d is connected to the liquid-side stop valve 28 of the outdoor unit 2 via a fourth on-off valve 7d, a fourth liquid separation pipe 46d, and the branching part 7e, and the other end thereof is connected to a fourth liquid-side connection part 53d of the fourth indoor unit 5d. The first to fourth on-off valves 7a to 7d are devices provided newly according to the present embodiment, and control of these devices is described down below.

One end of the gas pipe 9 is connected to a gas-side stop valve 29 of the outdoor unit 2, the other end thereof is branched into respective first to fourth gas-side connection parts 54a to 54d of the first to fourth indoor units 5a to 5d. A refrigerant circuit 10 of the air conditioner 1 is thus formed.

Configuration of Outdoor Unit

First, the outdoor unit 2 is described. The outdoor unit 2 includes: a compressor 21; a reversing valve 22, an outdoor heat exchanger 23; the liquid-side stop valve 28 that has one end thereof connected to a pipe into which the first to fourth liquid separation pipes 46a to 46d is merged via the branching part 7e; the gas-side stop valve 29 to which the gas pipe 9 is connected; and an outdoor fan 27. These devices except for the outdoor fan 27 are connected to one another via corresponding refrigerant pipes described below, thereby forming an outdoor unit refrigerant circuit 20, which constitutes a part of the refrigerant circuit 10. An accumulator (not illustrated) may be provided to the refrigerant suction side of the compressor 21.

The compressor 21 is a variable-capacity compressor capable of changing an operational capacity by having the rotational speed thereof controlled by an inverter not illustrated. The refrigerant discharge side of the compressor 21 is connected via a discharge pipe 41 to a port a of the reversing valve 22 described later. The refrigerant suction side of the compressor 21 is connected via a suction pipe 42 to a port c of the reversing valve 22.

The reversing valve 22 is a valve for switching directions in which the refrigerant flows and includes four ports a, b, c, and d. The port a is connected to the refrigerant discharge side of the compressor 21 via the discharge pipe 41 as described above. The port b is connected to one of the refrigerant entrance/exit ports of the outdoor heat exchanger 23 via a refrigerant pipe 43. The port c is connected to the refrigerant suction side of the compressor 21 via the suction pipe 42 as described above. The port d is connected to the gas-side stop valve 29 via an outdoor unit gas pipe 44.

The outdoor heat exchanger 23 uses rotation of the outdoor fan 27, described below, to cause the refrigerant and outdoor air that has been introduced into the outdoor unit 2 to exchange heat therebetween. The one refrigerant entrance/exit port of the outdoor heat exchanger 23 is connected to the port b of the reversing valve 22 via the refrigerant pipe 43 as described above, and one end of an outdoor unit liquid pipe 45 is connected to the other refrigerant entrance/exit port. The outdoor heat exchanger 23 functions as a condenser during cooling operation or functions as an evaporator during heating operation in accordance with the switching of the reversing valve 22.

The outdoor fan 27 is made of a resin material and is disposed near the outdoor heat exchanger 23. The outdoor fan 27 has a center part thereof connected to the rotational axis of a fan motor not illustrated. The outdoor fan 27 rotates when the fan motor rotates. When the outdoor fan 27 rotates, outdoor air is introduced into the outdoor unit 2 from an inlet port, not illustrated, of the outdoor unit 2, and outdoor air that has exchanged heat with the refrigerant in the outdoor heat exchanger 23 is discharged to the outside of the outdoor unit 2 from an outlet port, not illustrated, of the outdoor unit 2.

Various sensors are provided in the outdoor unit 2 in addition to the above-described configuration. As illustrated in FIG. 1A, a discharge pressure sensor 31 that detects the pressure of the refrigerant discharged from the compressor 21, and a discharge temperature sensor 33 that detects the temperature (the above-described discharge temperature) of the refrigerant discharged from the compressor 21 are provided to the discharge pipe 41. A suction pressure sensor 32 that detects the pressure of the refrigerant suctioned into the compressor 21, and a suction temperature sensor 34 that detects the temperature of the refrigerant suctioned into the compressor 21 are provided to the suction pipe 42. An outdoor heat exchanger temperature sensor 35 that detects an outdoor heat exchanger temperature, which is the temperature of the outdoor heat exchanger 23, is provided in a substantially intermediate part of a refrigerant path, not illustrated, of the outdoor heat exchanger 23.

An outdoor air temperature sensor 100 that detects the temperature of outdoor air flowing into the inside of the outdoor unit 2, that is, the outdoor air temperature, is further provided near the inlet port, not illustrated, of the outdoor unit 2.

Figure 1B:
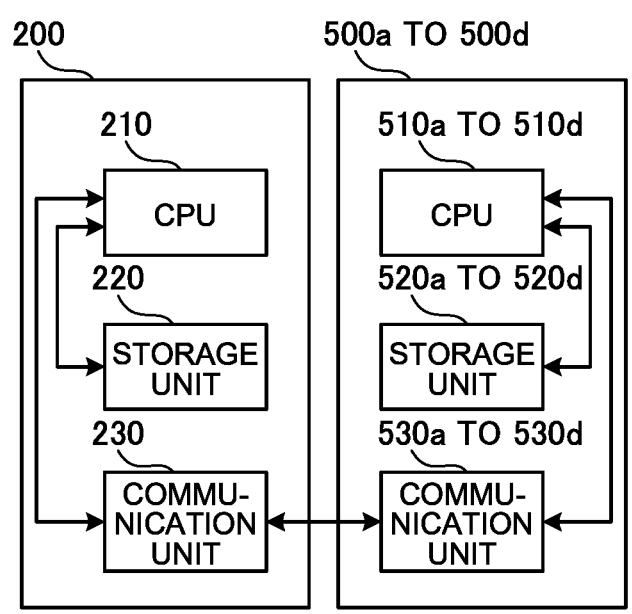
FIG. 1B is a block diagram of a control unit in the air conditioner of the present embodiment.

An outdoor unit control unit 200 is additionally provided in the outdoor unit 2. The outdoor unit control unit 200 is mounted on a control board housed in an electrical component box, not illustrated, of the outdoor unit 2. As illustrated in FIG. 1B, the outdoor unit control unit 200 includes an outdoor central processing unit (CPU) 210, an outdoor storage unit 220, and an outdoor communication unit 230 (the outdoor unit control unit 200 may be referred to simply as a control unit in the present specification).

The outdoor storage unit 220 is configured as a flash memory and has, for example, the following stored therein: a control program for the outdoor unit 2; detection values that correspond to detection signals from the various sensors; and the states of control of components such as the compressor 21 and the outdoor fan 27. The outdoor storage unit 220 also has a rotational speed table previously stored therein that has rotational speeds of the compressor 21 determined in accordance with requested capabilities expected to be received from the first to fourth indoor units 5a to 5d, although the illustration of the rotational speed table is omitted. The outdoor communication unit 230 is an interface that communicates with the first to fourth indoor units 5a to 5d.

The outdoor CPU 210 receives detection results acquired by the above-described individual sensors of the outdoor unit 2 and acquires control signals transmitted from the first to fourth indoor units 5a to 5d via the outdoor communication unit 230. Based on the received detection results and control signals, the outdoor CPU 210 performs control for driving the compressor 21 and the outdoor fan 27 and for switching the reversing valve 22. Based on the received detection results and control signals, the outdoor CPU 210 also performs control for opening and closing the first to fourth the on-off valves 7a to 7d.

Configurations of Indoor Units

Next, the first to fourth indoor units 5a to 5d are described. All of the relative positional relations and all of the configurations of the first to fourth indoor units 5a to 5d in the refrigerant circuit 10 are the same, and the following description therefore discusses only the positional relation and the configuration of the first indoor unit 5a and omits discussion on the other second to fourth indoor units 5b to 5d. In FIG. 1A, in each of the second to the fourth indoor units 5b to 5d, constituent devices that correspond to the constituent devices in the first indoor unit 5a are indicated by reference signs obtained by changing the last symbols of the reference signs assigned to the constituent devices in the first indoor unit 5a from "a" to "b", "c", or "d".

The first indoor unit 5a includes: a first indoor heat exchanger 51a; the first liquid-side connection part 53a to which the first liquid pipe 8a is connected; a first indoor expansion valve 24a; a first gas-side connection part 54a to which the other end (opposite to one end thereof connected to the gas-side stop valve 29 in the outdoor unit 2) of the gas pipe 9 that is branched; and a first indoor fan 55a. These devices except for the first indoor fan 55a are connected to one another via corresponding refrigerant pipes, thereby forming a first indoor unit refrigerant circuit 50a, which constitutes a part of the refrigerant circuit 10 (an indoor expansion valve may be referred to simply as an expansion valve in the present specification).

The first indoor heat exchanger 51a uses rotation of the first indoor fan 55a to cause the refrigerant and indoor air that has been introduced into the first indoor unit 5a through an inlet port, not illustrated, of the first indoor unit 5a to exchange heat therebetween. One of the refrigerant entrance/exit ports of the first indoor heat exchanger 51a is connected to the first liquid-side connection part 53a via a first indoor unit liquid pipe 71a. The other refrigerant entrance/exit port of the first indoor heat exchanger 51a is connected to the first gas-side connection part 54a via a first indoor unit gas pipe 72a. The first indoor heat exchanger 51a functions as an evaporator when the first indoor unit 5a performs cooling operation, and functions as a condenser when the first indoor unit 5a performs heating operation. Individual refrigerant pipes are connected by welding or flare nuts in the first liquid-side connection part 53a and the first indoor unit gas pipe 72a.

The first indoor expansion valve 24a is an electronic expansion valve driven by a pulse motor not illustrated. Specifically, the degree of opening thereof is adjusted by the number of pulses applied to the pulse motor. The amount of refrigerant flowing through the first indoor heat exchanger 51a is adjusted by adjusting the degree of opening of the first indoor expansion valve 24a.

The first indoor fan 55a is made of a resin material, is preferably a cross-flow fan, and is disposed near the first indoor heat exchanger 51a. When the first indoor fan 55a is caused to rotate by the fan motor not illustrated, indoor air is introduced into the first indoor unit 5a from an inlet port, not illustrated, of the first indoor unit 5a, and indoor air that has exchanged heat with the refrigerant in the first indoor heat exchanger 51a is blown out into a room from an outlet port, not illustrated, of the first indoor unit 5a.

Various sensors are provided in the first indoor unit 5a in addition to the above-described configuration. A first indoor heat exchanger temperature sensor 61a that detects the temperature of the first indoor heat exchanger 51a is provided to the first indoor heat exchanger 51a. A first gas temperature sensor 63a is provided to the first indoor unit gas pipe 72a. A first indoor temperature sensor 62a that detects the temperature of indoor air flowing into the first indoor unit 5a, that is, an indoor temperature, is provided near the inlet port, not illustrated, of the first indoor unit 5a.

A first indoor unit control unit 500a is provided in the first indoor unit 5a. The first indoor unit control unit 500a is mounted on a control board housed in an electrical component box, not illustrated, of the first indoor unit 5a and includes a first indoor CPU 510a, a first indoor storage unit 520a, and a first indoor communication unit 530a as illustrated in FIG. 1B (the first indoor unit control unit 500a may be referred to simply as a control unit in the present specification).

The first indoor storage unit 520a is configured as a flash memory and has, for example, the following stored therein: a control program for the first indoor unit 5a; detection values that correspond to detection signals from the various sensors; and setting information provided by a user regarding air conditioning operation. The first indoor communication unit 530a is an interface that communicates with the outdoor unit 2 and the other second to fourth indoor units 5b to 5d.

The first indoor CPU 510a receives detection values acquired by the various sensors and receives, via a remote controller light receiving part not illustrated, signals input thereto that contain operational conditions and a timer operation setting that have been set by a user using a remote controller not illustrated. Based on the various detection values thus received and the various kinds of information thus input, the first indoor CPU 510a performs control for driving the first indoor fan 55a and adjusts the degrees of opening of the first to fourth indoor expansion valves 24a to 24d. The first indoor CPU 510a transmits, to the outdoor unit 2 via the first indoor communication unit 530a, operation information signals that contain an operation start/stop signal and operational information (such as a set temperature and the indoor temperature).

Operation of Refrigerant Circuit

Next, the flow of the refrigerant and the operation of the individual components in the refrigerant circuit 10 when the air conditioner 1 in the embodiment performs air conditioning operation are described with reference to FIG. 1A. The following description discusses a case in which the first to fourth indoor units 5a to 5d performs cooling operation (or defrosting operation; the same applies hereinbelow) and omits detailed discussion of a case in which heating operation is performed. Arrows in FIG. 1A indicate the flow of the refrigerant during cooling operation. Control that is performed to prevent the refrigerant in the liquid phase from accumulating in the at least one indoor unit and in the corresponding liquid pipe when at least one of the first to fourth indoor units 5a to 5d has stopped operation during cooling operation.

When the first to fourth indoor units 5a to 5d performs cooling operation, the outdoor CPU 210 switches the reversing valve 22 into a state illustrated as indicated by solid lines, that is, so that the port a and the port b of the reversing valve 22 can communicate with each other and so that the port c and the port d thereof can communicate with each other, as illustrated in FIG. 1A. Consequently, a cooling cycle is formed in which the refrigerant circulates in a direction indicated by the solid-line arrow in the refrigerant circuit 10, the outdoor heat exchanger 23 functions as a condenser, and the first to fourth indoor heat exchangers 51a to 51d function as evaporators.

The refrigerant having high pressure that has been discharged from the compressor 21 and then flowed out from the discharge pipe 41 into the port a of the reversing valve 22 flows through the refrigerant pipe 43 from the port b of the reversing valve 22 and flows into the outdoor heat exchanger 23. The refrigerant that has flowed into the outdoor heat exchanger 23 condenses by exchanging heat with outdoor air that has been introduced into the outdoor unit 2 by rotation of the outdoor fan 27.

The refrigerant that has flowed out from the outdoor heat exchanger 23 flows through the outdoor unit liquid pipe 45 and is then branched after passing through the liquid-side stop valve 28, and thus flows into the first to fourth liquid separation pipes 46a to 46d. The refrigerant that has flowed through the first to fourth liquid separation pipes 46a to 46d flows into the first to fourth liquid pipes 8a to 8d via the first to fourth on-off valves 7a to 7d. The refrigerant then flows into the first to fourth indoor units 5a to 5d via the first to fourth liquid-side connection parts 53a to 53d.

The refrigerant that has flowed into the first to fourth indoor units 5a to 5d is decompressed while passing through the first to fourth indoor expansion valves 24a to 24d, then flows through the first to fourth indoor unit liquid pipes 71a to 71d, and flows into the first to fourth indoor heat exchangers 51a to 51d. The refrigerant that has flowed into the first to fourth indoor heat exchangers 51a to 51d evaporates by exchanging heat with indoor air that has been introduced into the first to fourth indoor units 5a to 5d by rotation of the first to fourth indoor fans 55a to 55d. Thus, the first to fourth indoor heat exchangers 51a to 51d functions as evaporators, and, during cooling operation, indoor spaces having the first to fourth indoor units 5a to 5d installed therein are cooled by having indoor air that has exchanged heat with the refrigerant in the first to fourth indoor heat exchangers 51a to 51d blown out into the indoor spaces through outlet ports not illustrated.

The refrigerant that has flowed out from the first to fourth indoor heat exchangers 51a to 51d flows through the first to fourth indoor unit gas pipes 72a to 72d and, after passing through the first to fourth gas-side connection parts 54a to 54d, merges into one stream and flows into the gas pipe 9. The refrigerant flowing through the gas pipe 9 flows into the outdoor unit 2 via the gas-side stop valve 29, then flows through, in order, the outdoor unit gas pipe 44, the port d and the port c of the reversing valve 22, and the suction pipe 42, and then is suctioned by the compressor 21 to condense again.

When the first to fourth indoor units 5a to 5d perform heating operation, that is, the refrigerant circuit 10 works as a heating cycle, the outdoor unit 2 operates in a manner such that the reversing valve 22 is switched into a state illustrated as indicated by broken lines, that is, so that the port a and the port d of the reversing valve 22 can communicate with each other and so that the port b and the port c thereof can communicate with each other. Consequently, the outdoor heat exchanger 23 functions as an evaporator, and the first to fourth indoor heat exchangers 51a to 51d function as condensers.

Prevention of Accumulation of Refrigerant in Liquid Phase

In the multi-type air conditioner 1 according to the present embodiment, when among the first to fourth indoor units 5a to 5d, at least one indoor unit stops operating and the other indoor units include an operating unit (which means the indoor unit that is operating) during cooling operation, the following control is performed to quickly clear accumulation of the refrigerant in the liquid phase in a stopping unit (which means the indoor unit that has stopped operating) and in a liquid pipe that corresponds to the stopping unit, whereby the amount of refrigerant is reduced while the capability is secured.

Figure 2:
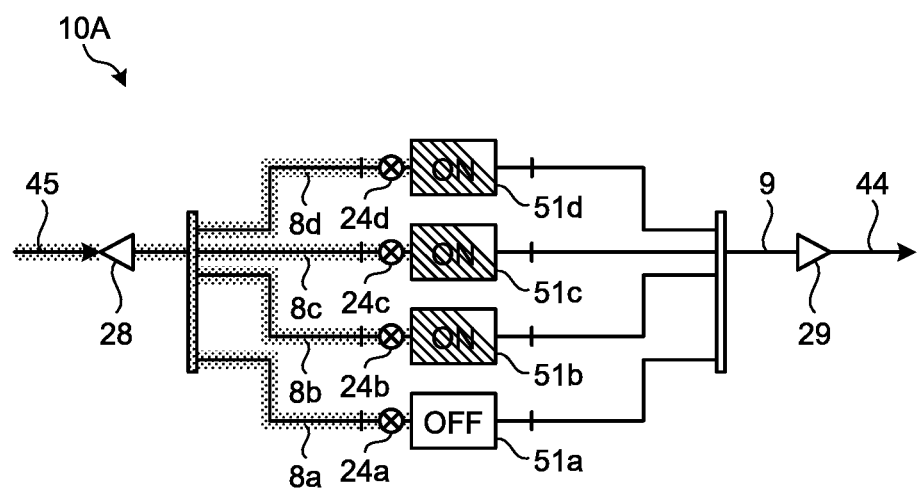
FIG. 2 is a diagram schematically illustrating accumulation of a refrigerant that occurs when at least one indoor unit has stopped operating during cooling operation in a conventional air conditioner.
Figure 3:
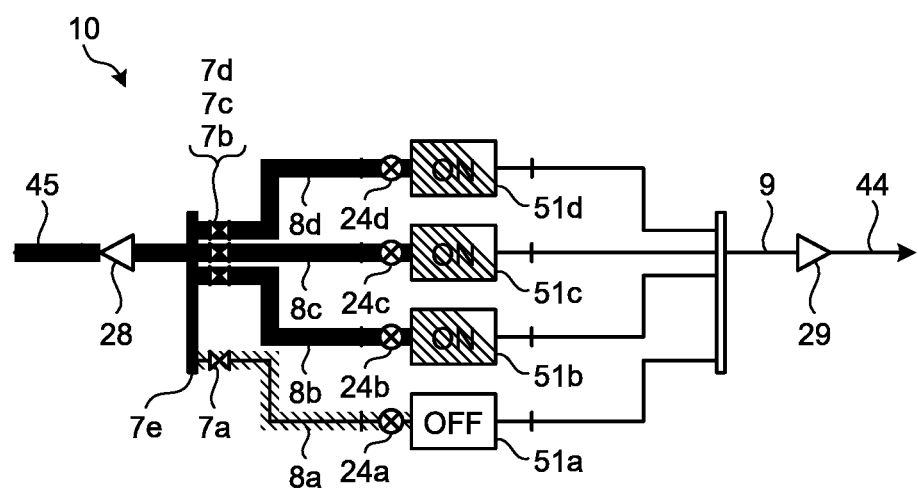
FIG. 3 is a diagram schematically illustrating control of accumulation of a refrigerant that occurs when at least one indoor unit has stopped operating during cooling operation in the air conditioner of the present embodiment.
Figure 4:
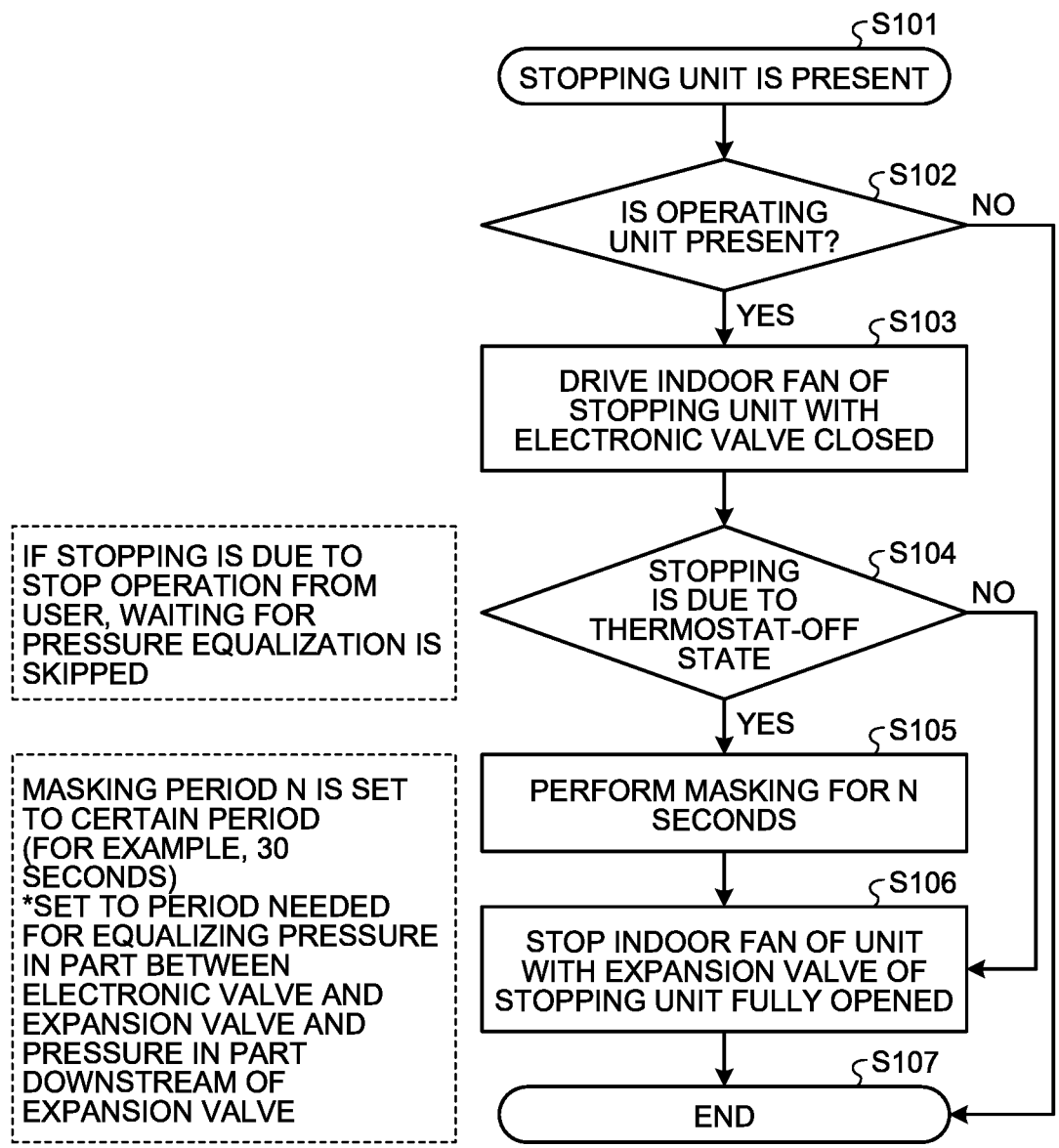
FIG. 4 is a procedure explaining the same control of the accumulation of the refrigerant in the liquid phase.

FIG. 2 and FIG. 3 are diagrams each schematically illustrating accumulation of a refrigerant at a time when at least one indoor unit has stopped operating during cooling operation. While FIG. 2 illustrates a state in a refrigerant circuit 10A of a conventional air conditioner, FIG. 3 illustrates a state in the refrigerant circuit 10 of the air conditioner 1 according to the present embodiment. FIG. 4 illustrates the procedure of control of the refrigerant circuit 10.

The following describes control for preventing accumulation of the refrigerant in the liquid phase. While the following describes the first indoor unit 5a as an example of the stopping unit and the second indoor unit 5b as an example of the operating unit, the same procedure of the control is performed regardless of which of the indoor units the stopping unit and the operating unit are and regardless of how many indoor units there are as the stopping units and the operating units.

In the conventional refrigerant circuit 10A, as illustrated in FIG. 2, the refrigerant in two phases of gas and liquid at a low concentration flows through the second indoor heat exchanger 51b in the second indoor unit 5b, and the refrigerant in the liquid phase at a high concentration flows through the corresponding second liquid pipe 8b. In this state, upon being instructed to stop operating, the first indoor heat exchanger 51a in the first indoor unit 5a closes the first indoor expansion valve 24a, whereby the refrigerant enters the gas phase. However, the refrigerant in the liquid phase accumulates in the corresponding first liquid pipe 8a as in the second liquid pipe 8b.

In contrast, in the refrigerant circuit 10 according to the present embodiment, the first on-off valve 7a is provided in a part of the first liquid pipe 8a located upstream of the first indoor unit 5a, the part being near the branching part 7e, as illustrated in FIG. 3. The second on-off valve 7b is provided in a part of the second liquid pipe 8b located upstream of the second indoor unit 5b, the part being near the branching part 7e. The third on-off valve 7c is provided in a part of the third liquid pipe 8c located upstream of the third indoor unit 5c, the part being near the branching part 7e. The fourth on-off valve 7d is provided in a part of the fourth liquid pipe 8d located upstream of the fourth indoor unit 5d, the part being near the branching part 7e. The first on-off valve 7a and the first indoor expansion valve 24a in the first indoor unit 5a, which is the stopping unit, are controlled, so that the refrigerant accumulated in the first liquid pipe 8a enters the two phases of gas and liquid from the liquid phase. The procedure of the control is as follows.

The flowchart illustrated in FIG. 4 represents the procedure of processing that is performed by the outdoor CPU 210 when among the two or more indoor units that have been performing cooling operation, at least one indoor unit needs to stop operating. In the flowchart, "S" indicates "step", and a number that follows "S" indicates a step number.

As illustrated in FIG. 4, when there is an indoor unit that needs to stop operating as a result of instruction to stop the first indoor unit 5a (step S101), it is determined whether there is an operating unit among the indoor units connected to the outdoor unit 2 (step S102). When there is no operating unit, that is, the determination is negative, this procedure is ended (step S107). In contrast, if the second indoor unit 5b is performing cooling operation as the operating unit, the determination is affirmative, so that the first on-off valve 7a is closed and the first indoor fan 55a is continued to be driven for the first indoor unit 5a (the stopping unit) (step S103). Consequently, the refrigerant in the liquid phase at a high concentration, which is found spreading in the first liquid pipe 8a between the first on-off valve 7a and the first indoor expansion valve 24a when the first indoor unit 5a is caused to stop operating, is attracted toward the side of low pressure. The refrigerant in the liquid phase that has passed through the first indoor expansion valve 24a flows through the first indoor unit 5a to have the pressure thereof equalized. The refrigerant that has flowed into the first indoor unit 5a is evaporated and lowered in concentration in the first indoor unit 5a by having the first indoor fan 55a kept driven. That is, the refrigerant is prevented from accumulating inside the first indoor unit 5a, which is the stopping unit, while being at a high concentration.

Subsequently, the first indoor unit 5a determines whether the stopping is due to thermostat-off operation (step S104). If the determination returns an affirmative result, the control at step S103 is continued for a certain period (for example, 30 seconds) that is needed for equalizing pressure in a part between the first on-off valve 7a and the first indoor expansion valve 24a and pressure in a part downstream of the first indoor expansion valve 24a (step S105). In FIG. 4, this certain period is expressed as a masking period N.

Finally, after the elapse of the certain period, the first indoor fan 55a is stopped with the first indoor expansion valve 24a of the first indoor unit 5a fully opened (step S106). If the determination at step S104 returns a negative result, the procedure is shifted to step S106 without being shifted to step S105, and the first indoor fan 55a is stopped with the first indoor expansion valve 24a of the first indoor unit 5a fully opened (step S106). Subsequently, the procedure is ended (step S107).

The above-described determination at step S104 is made for the following reason. That is, determination is made as to whether a signal to stop the first indoor unit 5a is an operation stop instruction due to thermostat-off operation issued because a room temperature has reached a set temperature or is an operation stop instruction due to a stop operation from a user. If the signal is due to thermostat-off operation, in order to prevent a user from mistakenly thinking that the air conditioner 1 has failed, the procedure can proceed to waiting until the pressure in the part between the first on-off valve 7a and the first indoor expansion valve 24a and the pressure in the part downstream of the first indoor expansion valve 24a are equalized so as not to generate noise of the refrigerant that is otherwise caused when the first indoor unit 5a stops operating, and then stopping the first indoor fan 55a at the same time as fully opening the first indoor expansion valve 24a of the first indoor unit 5a. If the signal is due to a stop operation from a user, occurrence of noise of the refrigerant is associated with an operation from the user, and the user can less likely to mistakenly think that the air conditioner 1 has failed. For this reason, the procedure allows occurrence of noise of the refrigerant and proceeds to, without waiting for equalization of pressure in the part between the first on-off valve 7a and the first indoor expansion valve 24a and pressure in the part downstream of the first indoor expansion valve 24a, stopping the first indoor fan 55a at the same time as fully opening the first indoor expansion valve 24a of the first indoor unit 5a. Thus, a feeling of suspicion can be alleviated that is otherwise aroused in the user with the indoor fan kept rotating despite the stop operation.

According to the above-described embodiment, the refrigerant in the liquid phase can be prevented from accumulating in the first indoor unit 5a that has stopped operating during cooling operation and in the first liquid pipe 8a that corresponds thereto.

REFERENCE SIGNS LIST

1 AIR CONDITIONER
2 OUTDOOR UNIT
5a, 5b, 5c, 5d FIRST TO FOURTH INDOOR UNITS
7a, 7b, 7c, 7d FIRST TO FOURTH ON-OFF VALVES
8a, 8b, 8c, 8d FIRST TO FOURTH LIQUID PIPES
9 GAS PIPE
10 REFRIGERANT CIRCUIT
20 OUTDOOR UNIT REFRIGERANT CIRCUIT
21 COMPRESSOR
22 REVERSING VALVE (a, b, c, d PORT)
23 OUTDOOR HEAT EXCHANGER
24a, 24b, 24c, 24d FIRST TO FOURTH INDOOR EXPANSION VALVES
27 OUTDOOR FAN
28 LIQUID-SIDE STOP VALVE
29 GAS-SIDE STOP VALVE
31 DISCHARGE PRESSURE SENSOR
32 SUCTION PRESSURE SENSOR
33 DISCHARGE TEMPERATURE SENSOR

34 SUCTION TEMPERATURE SENSOR
35 OUTDOOR HEAT EXCHANGER TEMPERATURE SENSOR
41 DISCHARGE PIPE
42 SUCTION PIPE
43 REFRIGERANT PIPE
44 OUTDOOR UNIT GAS PIPE
45 OUTDOOR UNIT LIQUID PIPE
46a, 46b, 46c, 46d FIRST TO FOURTH LIQUID SEPARATION PIPES
50a, 50b, 50c, 50d FIRST TO FOURTH INDOOR UNIT REFRIGERANT CIRCUITS
51a, 51b, 51c, 51d FIRST TO FOURTH INDOOR HEAT EXCHANGERS
53a, 53b, 53c, 53d FIRST TO FOURTH LIQUID-SIDE CONNECTION PARTS
54a, 54b, 54c, 54d FIRST TO FOURTH GAS-SIDE CONNECTION PARTS
55a, 55b, 55c, 55d FIRST TO FOURTH INDOOR FANS
61a, 61b, 61c, 61d FIRST TO FOURTH INDOOR HEAT EXCHANGER TEMPERATURE SENSORS
62a, 62b, 62c, 62d FIRST TO FOURTH INDOOR TEMPERATURE SENSORS
63a, 63b, 63c, 63d FIRST TO FOURTH GAS TEMPERATURE SENSORS
71a, 71b, 71c, 71d FIRST TO FOURTH INDOOR UNIT LIQUID PIPES
72a, 72b, 72c, 72d FIRST TO FOURTH INDOOR UNIT GAS PIPES
100 OUTDOOR AIR TEMPERATURE SENSOR
200 OUTDOOR UNIT CONTROL UNIT (CONTROL UNIT)
210 OUTDOOR CPU
220 OUTDOOR STORAGE UNIT
230 OUTDOOR COMMUNICATION UNIT
500a, 500b, 500c, 500d FIRST TO FOURTH INDOOR UNIT CONTROL UNITS (CONTROL UNITS)
510a, 510b, 510c, 510d FIRST TO FOURTH INDOOR CPUs
520a, 520b, 520c, 520d FIRST TO FOURTH INDOOR STORAGE UNITS
530a, 530b, 530c, 530d FIRST TO FOURTH INDOOR COMMUNICATION UNITS

The invention claimed is:

1. An air conditioner comprising:
an outdoor unit;
a plurality of indoor units including first and second indoor units, each of which has
an indoor heat exchanger,
an indoor fan inside thereof, and
an expansion valve provided upstream of the indoor heat exchanger;
a plurality of on-off valves including a first on-off valve connected to the first indoor unit and provided upstream of the expansion valve of the first indoor unit when the air conditioner is in the cooling mode, and a second on-off valve connected to the second indoor unit and provided upstream of the expansion valve of the second indoor unit when the air conditioner is in the cooling mode; and
a processor configured to selectively control the first and second indoor units and the first and second on-off valves, wherein the processor is configured to perform a stop procedure to stop operation of the first indoor unit when the first indoor unit is currently operating and the second indoor unit is also currently operating and when the stopping of the operation of the first currently-operating indoor unit is due to a room temperature reaching a set temperature,
the processor also being configured to, during the stop procedure, close the first on-off valve and drive the indoor fan in the first indoor unit until pressure in a part of the air conditioner connecting the first on-off valve and the expansion valve of the first indoor unit and pressure in a part of the air conditioner downstream of the expansion valve of the first indoor unit are equalized, fully opening the expansion valve of the first indoor unit, and stopping the indoor fan of the first indoor unit.

2. The air conditioner according to claim 1, wherein the processor is configured to open the expansion valve of the first indoor unit fully and stop the operation of the indoor fan in the first indoor unit, without waiting for equalization of the pressure in the part of the air conditioner connecting the first on-off valve and the expansion valve of the first indoor unit and the pressure in the part of the air conditioner downstream of the expansion valve of the first indoor unit when the stopping of the operation of the first indoor unit is due to a stop operation initiated by a user.

3. The air conditioner according to claim 1,
wherein the part of the air conditioner connecting the first on-off valve and the expansion valve of the first indoor unit comprises a first liquid pipe,
wherein a part of the air conditioner connecting the second on-off valve and the expansion valve of the second indoor unit comprises a second liquid pipe,
wherein the first indoor unit further has a first indoor-unit liquid pipe inside the first indoor unit and connected to the first expansion valve,
wherein the second indoor unit further has a second indoor-unit liquid pipe inside the second indoor unit and connected to the second expansion valve, and
wherein the air conditioner further comprises a branching part connected to the outdoor unit and connected to the first and second liquid pipes via the first and second on-off valves, respectively.

* * * * *